US012736461B2

(12) United States Patent
Vaca Torres et al.

(10) Patent No.: US 12,736,461 B2
(45) Date of Patent: Sep. 15, 2026

(54) DEVICE WITH A MEASURING CELL FOR MEASURING A MEASURED VARIABLE OF A MEDIUM FLOWING THROUGH A MEASURING CELL

(71) Applicant: Endress+Hauser Conducta GmbH+Co. KG, Gerlingen (DE)

(72) Inventors: Alejandro Vaca Torres, Steinheim (DE); Hans Meyer, Eschach (DE); Andreas Müller, Ostfildern (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 233 days.

(21) Appl. No.: 18/615,783

(22) Filed: Mar. 25, 2024

(65) Prior Publication Data

US 2024/0319074 A1 Sep. 26, 2024

(30) Foreign Application Priority Data

Mar. 23, 2023 (DE) ..................... 10 2023 107 376.1

(51) Int. Cl.
*G01N 21/85* (2006.01)
*G01N 21/03* (2006.01)
*G01N 21/05* (2006.01)

(52) U.S. Cl.
CPC ......... *G01N 21/05* (2013.01); *G01N 21/0303* (2013.01); *G01N 2021/0389* (2013.01)

(58) Field of Classification Search
CPC ............... G01N 21/05; G01N 21/0303; G01N 2021/0389; G01N 21/85; G01N 2021/8557; G01N 21/03; G01N 21/01
See application file for complete search history.

(56) References Cited

U.S. PATENT DOCUMENTS 5,552,885 A * 9/1996 Steen ................. G01N 15/1404 356/73
7,369,226 B1 5/2008 Hewitt
(Continued)

FOREIGN PATENT DOCUMENTS

| | | | |
|---|---|---|---|
| DE | 102013013709 A1 | | 8/2014 |
| JP | 2009180665 A | * | 8/2009 |
| WO | 2019185678 A1 | | 10/2019 |

OTHER PUBLICATIONS

Pike et al, “Flow Cell Design for Effective Biosensing”, Dec. 2012, Sensors 13(1), pp. 58-70 (Year: 2012).*

*Primary Examiner* — Michael A Lyons
*Assistant Examiner* — Judy Dao Tran
(74) *Attorney, Agent, or Firm* — Christopher R. Powers; Endress+Hauser (USA) Holding, Inc.

(57) ABSTRACT

A device for measuring a measured variable of a medium includes: a measuring cell, through which the medium can flow, in the inner chamber of which a channel opens on an inlet side and on an outlet side; a first duct opening into the inner chamber; a first component in the first duct such that an end portion of the first component projects into the inner chamber; and a first molded part, which surrounds on the end portion of the first component and a hollow chamber adjacent to the first component in the inner chamber, and includes, for each channel, a recess which connects the hollow chamber to the corresponding channel and is configured as a cross-sectional converter.

17 Claims, 4 Drawing Sheets

(56) References Cited

U.S. PATENT DOCUMENTS

| | | | | |
|---|---|---|---|---|
| 7,961,310 | B1 * | 6/2011 | Milosevic | G01N 21/3577 356/440 |
| 8,649,005 | B2 * | 2/2014 | Tormod | G01N 21/05 356/246 |
| 10,996,161 | B2 * | 5/2021 | Simpkin | G01N 21/05 |
| 2013/0215412 | A1 | 8/2013 | Wynn | |
| 2022/0097065 | A1 * | 3/2022 | Alarji | G01N 21/272 |

* cited by examiner

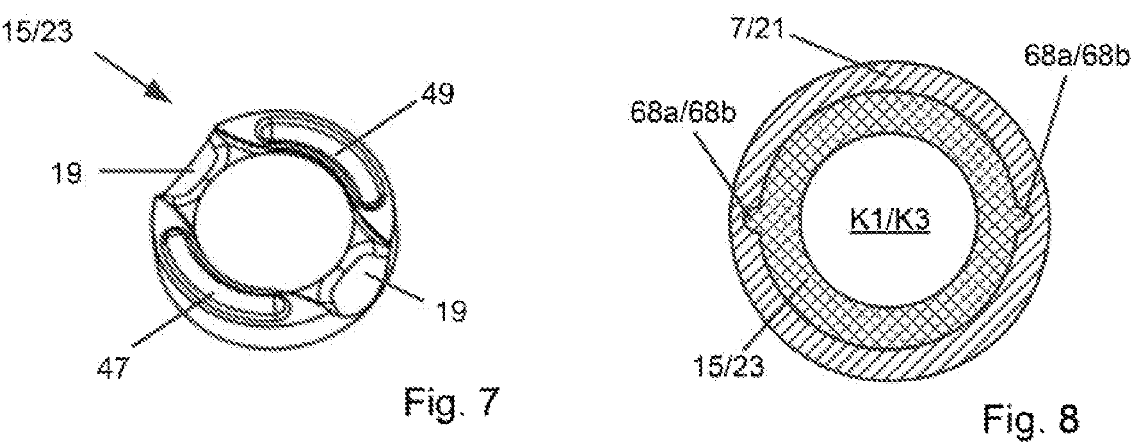
Fig. 7
Fig. 8
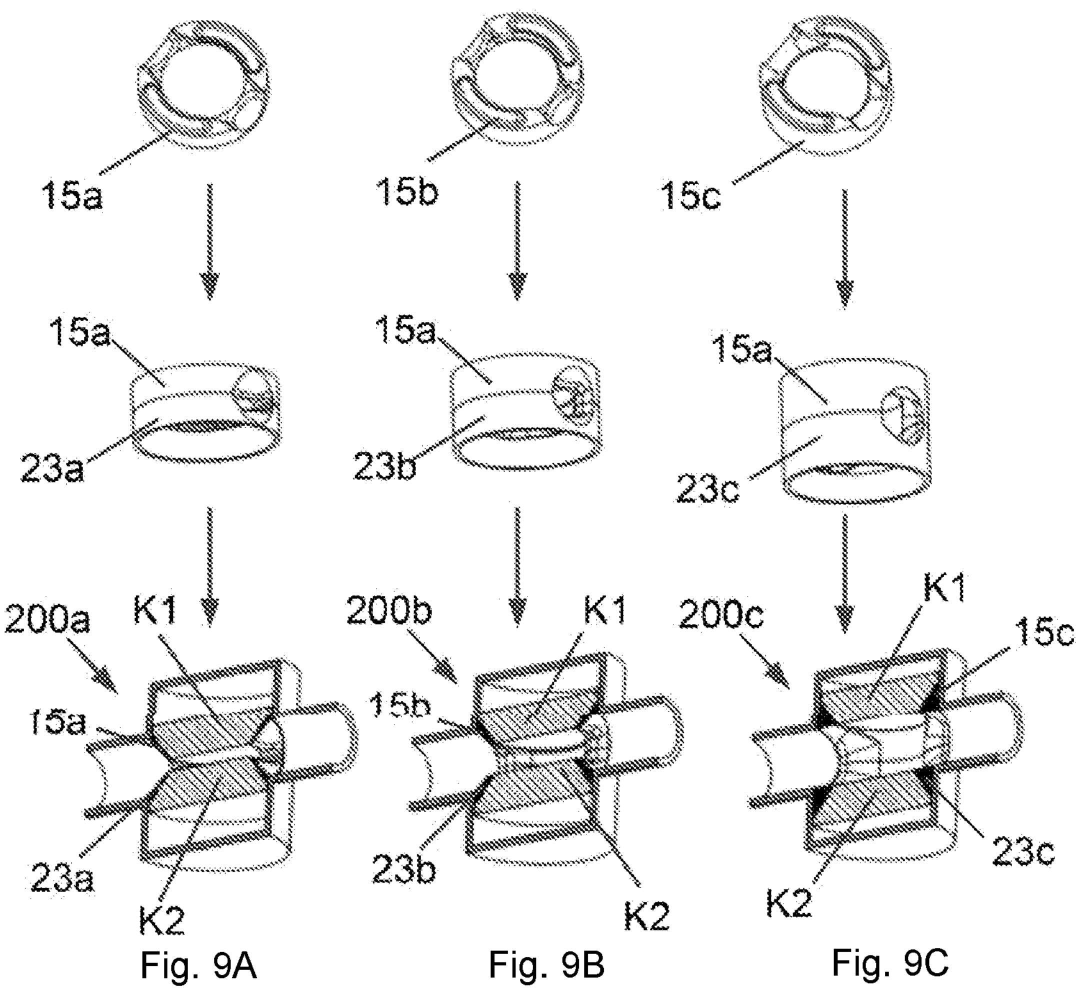
Fig. 9A
Fig. 9B
Fig. 9C

DEVICE WITH A MEASURING CELL FOR MEASURING A MEASURED VARIABLE OF A MEDIUM FLOWING THROUGH A MEASURING CELL

CROSS-REFERENCE TO RELATED APPLICATION

The present application is related to and claims the priority benefit of German Patent Application No. 10 2023 107 376.1, filed Mar. 23, 2023, the entire contents of which are incorporated herein by reference.

TECHNICAL FIELD

The present disclosure relates to a device for measuring a measured variable of a medium, including a measuring cell through which the medium flows and into which a sensor component is inserted to a selected insertion depth.

BACKGROUND

Devices equipped with a measuring cell configured as a flow cell are used in a plurality of different applications for measuring a wide variety of measured variables. For this purpose, these devices are, for example, equipped with a measuring device such as a sensor which is configured to measure the measured variable of the medium flowing through the measuring cell and to provide a measurement result of the measured variable.

In many of these devices, at least one component projecting into the inner chamber of the measuring cell is required to perform the measurements. An example of this configuration are sensor components of a sensor that project into the inner chamber for measuring the measured variable such as, for example, measuring probes or measuring elements, such as for example temperature sensors or measuring electrodes. A further example are windows to be inserted into the measuring cell at a certain insertion depth, through which measurements such as, for example, optical measurements performable by means of an optical sensor, of the measured variable can be performed.

US 20130215412 A1 describes a device for performing optical measurements, which comprises a measuring cell configured as a flow cell block of stainless steel. The flow cell block comprises an inner chamber, connected to a channel on the inlet side and on the outlet side, and two ducts arranged opposite one another perpendicular to the flow direction. A window is clamped in each duct with the interposition of a seal in such a way that a portion of the window projects into the inner chamber of the flow cell block. The device comprises a transmitting device mountable on the flow cell block by means of which transmitted radiation is transmitted through one of the two windows into the medium located between the two windows, and a detector which receives the measurement radiation emerging from the opposite window resulting from an interaction of the transmitted radiation along an optical path passing through the medium.

In devices such as the device described in US 20130215412 A1, the path length of the optical path, along which the interaction with the medium takes place, corresponds to the distance between the windows opposite one another. This optical path length plays an important role with regard to both the measurement range and the measurement accuracy. In this case, optical paths of different path lengths are generally required or at least advantageous for different measurement tasks. For example, short optical path lengths are preferably used to measure the absorption of highly absorbent media in order to be able to receive measurement radiation of sufficiently high intensity. Conversely, significantly longer optical path lengths are preferably used to measure the absorption of weakly absorbing media in order to achieve a sufficiently high measuring effect.

This problem is addressed in US 20130215412 A1 in that the windows are installed with the interposition of spacers which can be selected from a group of spacers of different size. This offers the advantage that the insertion depth of the windows and therefore also the optical path length can be adjusted in stages via the selection of the spacers.

In U.S. patent application Ser. No. 18/509,406, filed Nov. 15, 2023 (the '406 Application), of Applicant, a device having a measuring cell through which the medium can flow is described, the measuring cell of which has recesses arranged opposite one another perpendicular to the flow direction, into which in each case a window mount equipped with a window can be inserted with an insertion depth selectable from a plurality of different insertion depths. For this purpose, the recesses on the inside for each insertion depth each have a set of support surfaces on which projections of the window mount can be placed.

Both the windows described in US 20130215412 A1 and window mounts described in the '406 Application represent components of the respective device which project further into the inner chamber of the measuring cell the shorter the optical path length corresponding to the distance of the components.

Each component projecting into the inner chamber of a measuring cell represents an obstacle which hinders the flow of the medium through the measuring cell. As a result, eddies and/or turbulences can arise which, under certain circumstances, can lead to impairments of the measurements and/or can have a negative effect on the medium. Accordingly, eddies and/or turbulences can, for example, lead to bubbles forming in the medium which impair the measurement. In addition, shearing forces can be exerted on the medium by eddies and/or turbulences. The latter can lead to damage to the medium especially in biotechnological applications in which the medium contains components sensitive to shear forces, such as cell cultures, for example. A further problem is caused by dead volumes due to sections of the components protruding into the inner chamber, which take up medium but through which the medium does not flow at all or only at a lower speed than other portions of the internal volume of the measuring cell through which the medium flows. Eddies, turbulence and/or dead volumes can lead to components of the medium having different properties, such as different densities flowing through the measuring cell at different speeds, and/or mixing of partial volumes of the medium entering the measuring cell in succession. Both lead to impairments of the measurements and of the medium.

The situation is particularly problematic with devices in which two components arranged opposite each other in the inner chamber of the measuring cell should or must be arranged at a short distance from each other. The latter is especially the case with the aforementioned devices for carrying out optical measurements, where, under certain circumstances, even optical path lengths corresponding to the distance are advantageous or necessary, which are smaller than a manufacturing-related minimum diameter of the channels.

SUMMARY

It is an object of the present disclosure to present devices of the type mentioned above with which, especially even with a large insertion depth of the components, a flow through the measuring cells that is as laminar and/or free of dead space as possible can be achieved.

For this purpose, the present disclosure comprises a device for measuring a measured variable of a medium, including:

a measuring cell through which the medium can flow in a flow direction, into the inner chamber of which a channel opens on the inlet side and on the outlet side;

a first duct opening into the inner chamber;

a first component which can be inserted or is inserted through the first duct into the inner chamber at a first insertion depth in such a way that an end-face portion of the first component projects into the inner chamber; and a first molded part, which:

a) surrounds, on the outside on all sides the portion of the first component inserted in the first insertion depth and a hollow chamber adjacent to an end face of the first component in the inner chamber; and b) has a recess for each channel that connects the hollow chamber to the respective channel, the cross-sectional area of which continuously transitions from a first cross-sectional area to a second cross-sectional area in the direction extending from the respective channel to the hollow chamber, wherein the first cross-sectional area corresponds to a channel cross-sectional area of the channel adjacent thereto, and the second cross-sectional area corresponds to a hollow chamber cross-sectional area of a hollow chamber region of the hollow chamber adjacent to the respective recess.

The device offers the advantage that the first molded part fills the dead volumes resulting from the insertion of the first component in a region of the inner chamber facing the first duct. In addition, the recesses configured as cross-sectional converters offer the advantage that abrupt cross-sectional changes that could trigger eddies and/or turbulences are largely avoided in the flow direction. This achieves a significantly more laminar flow through the measuring cell than would be the case without the first molded part.

The device of the present disclosure therefore offers the advantage that eddies and turbulences are largely avoided, and a more homogeneous flow profile of the medium flowing through the measuring cell is achieved. In addition, it offers the advantage that different speeds of components of the medium such as components of different densities, as well as mixing of volumes of the medium entering the measuring cell one after the other in time are largely avoided.

Embodiments of the device include:

the first component has a rear region arranged in the first duct and a front region adjacent thereto, tapering in parallel to the longitudinal axis of the first duct into the inner chamber of the measuring cell, which forms or comprises the portion of the first component arranged in the inner chamber and surrounded on the outside side on all sides by the first molded part; and/or the first molded part is clamped between the first component and a counter bearing, wherein the first molded part is clamped in particular between a lateral surface of the first component facing into the inner chamber of the measuring cell, in particular a lateral surface formed by a surface of the front region of the first component, and the counter bearing, wherein the counter bearing comprises in particular a wall region of the measuring cell opposite the first duct and delimiting the inner chamber.

A variant comprises a device, including:

a second duct which is arranged on a side of the inner chamber opposite the first duct and opens into the inner chamber;

a second component which can be inserted or is inserted through the second duct into the inner chamber at a second insertion depth in such a way that an end-face portion of the second component projects into the inner chamber; and a second molded part, which:

a) surrounds, on the outside on all sides, the portion of the second component inserted in the second insertion depth and a hollow chamber adjacent to an end face of the second component in the inner chamber; and b) has a recess for each channel that connects the hollow chamber to the respective channel, the cross-sectional area of which continuously transitions from a first cross-sectional area to a second cross-sectional area in the direction extending from the respective channel to the hollow chamber, wherein the first cross-sectional area corresponds to a channel cross-sectional area of the channel adjacent thereto, and the second cross-sectional area corresponds to a hollow chamber cross-sectional area of a hollow chamber region of the hollow chamber adjacent to the respective recess.

A first embodiment of such a variant comprises a device in which:

the first molded part and the second molded part rest against one another in the inner chamber of the measuring cell in such a way that their recesses adjoin one another in pairs;

the hollow chamber surrounded by the first molded part, together with the adjacent hollow chamber surrounded by the second molded part, forms a measurement chamber enclosed by both molded parts; and the measurement chamber is connected to each channel by a transition, wherein each transition is formed by one of the recesses of the first molded part and the recess of the second molded part adjacent thereto.

According to a further embodiment of such an embodiment, the measurement chamber has a laminar flow design, a dead space-free design and/or a cross-sectional area that does not change at all in the flow direction or at least only changes continuously, in particular only to a small extent.

A further embodiment of the first embodiment of the variant comprises a device in which:

an end of each transition adjacent to one of the channels has a cross-sectional area corresponding to or approximately corresponding to the channel cross-sectional area of the channel adjacent thereto; and an end of each transition adjacent to the measurement chamber has a cross-sectional area which corresponds or approximately corresponds to a measurement chamber cross-sectional area of a measurement chamber region of the measurement chamber adjacent to the respective transition.

A second embodiment of the variant comprises a device in which the first molded part and the second molded part have mutually complementary locking elements on their end faces facing one another in the inner chamber of the measuring cell, and which engage in a form-fit when the first molded part and the second molded part rest against one another in such a way that their recesses adjoin one another in pairs, wherein the locking elements of the first molded part and the locking elements of the second molded part are especially configured as element pairs in such a way that each molded part, with regard to its locking element, also comprises the locking element complementary thereto.

A third embodiment of the variant comprises a device in which:

the first molded part and the second molded part are arranged one on top of the other in a stack arranged or clamped between the first component and the second component; and/or the first molded part and the second molded part are arranged one on top of the another in a stack which is clamped between a lateral surface of the first component and a lateral surface of the second component, wherein the lateral surface of the first component is in particular a surface of a front region of the first component pointing into the measuring cell and tapering in a direction parallel to the longitudinal axis of the first duct into the measuring cell, and/or the lateral surface of the second component is in particular a surface of a front region of the second component pointing into the measuring cell and tapering in a direction parallel to the longitudinal axis of the second duct into the measuring cell.

A fourth embodiment of the variant comprises a device in which:

the end faces of the first component and the second component are arranged at the same distance from an axis which extends between the two end faces and coincides with the longitudinal axes of both channels; and/or the first molded part and the second molded part are structurally identical and/or are arranged and/or formed mirror-symmetrically to the axis coinciding with the longitudinal axes of the channels.

A fifth embodiment of the variant comprises a device in which the end faces of the first component and of the second component are arranged at a distance from one another in the inner chamber of the measuring cell, wherein the distance:

lies within a distance range of 1 mm to 20 mm and/or is adjustable in steps within a distance range, in particular a distance range of 1 mm to 20 mm, in which the first component can be inserted or is inserted at a first insertion depth that can be selected from several different insertion depths, and/or the second component can be inserted or is inserted at a second insertion depth that can be selected from several different insertion depths; and/or is less than or equal to a height of the internal chambers of the channels through which the flow passes and which extends parallel thereto and/or is one or a few millimeters, wherein the distance is in particular 1 mm to 10 mm, 1 mm to 8 mm, 1 mm to 5 mm or 1 mm to 3 mm.

Additional embodiments include:

the first molded part having at least one elastic bulge on the inside, which engages in a recess of the first component that is complementary thereto and/or has at least one elastic bulge on the outside, which engages in a recess of the first duct that is complementary thereto; and/or the second molded part having at least one elastic bulge on the inside, which engages in a recess of the second component that is complementary thereto and/or has at least one elastic bulge on the outside, which engages in a recess of the second duct that is complementary thereto.

Another embodiment comprises a device in which:

the first molded part comprises a region consisting of a sealing material which seals a gap existing between the first duct and the first component and surrounding the first component on the outside on all sides and opening into the inner chamber of the measuring cell; and/or the second molded part comprises a region consisting of a sealing material which seals a gap existing between the second duct and the second component and surrounding the second component on the outside on all sides and opening into the inner chamber of the measuring cell.

Another embodiment includes a device comprising a group of molded parts of different dimensions provided for several different insertion depths and configured in such a way that:

a) the first component is insertable or inserted at a first insertion depth selectable from a plurality of different insertion depths, and the first molded part is a molded part selectable or selected from the group on the basis of the first insertion depth selected for the first component; and/or b) the second component is insertable or inserted at a second insertion depth selectable from a plurality of different insertion depths, and the second molded part is a molded part selectable or selected from the group on the basis of the second insertion depth selected for the second component.

Another embodiment comprises a device in which:

the first duct and the first molded part have alignment elements which are complementary to one another and extend parallel to the longitudinal axis of the first duct and are configured in such a way that the first molded part can only be inserted into the measuring cell in one alignment through the first duct, in which the recesses of the first molded part open into one of the two channels after insertion; and/or the second duct and the second molded part have alignment elements which are complementary to one another and extend parallel to the longitudinal axis of the second duct and are configured in such a way that the second molded part can only be inserted into the measuring cell in one alignment through the second duct, in which the recesses of the second molded part open in one of the two channels after insertion.

Embodiments of the device include:

measuring cell thereof is configured as a flow cell and/or as a disposable measuring cell, is configured as a one-piece body, is made of a plastic and/or a sterilizable material, and/or is configured as an injection-molded part;

the first component and/or the second component is/are each configured as a sensor component of a sensor for measuring the measured variable(s), comprises a housing with a measuring element inserted therein at the front, is configured as a window, or is configured as a window mount equipped with a window;

the first molded part and/or the second molded part in each case:

is configured as a one-piece molded part and/or consists entirely or sectionally of a sealing material, a rubber or an elastomer; and/or has a smooth, chemically resistant, abrasion-resistant and/or a surface having antibacterial properties, or is coated with a coating having smooth, chemically resistant, abrasion-resistant and/or antibacterial properties; and/or the device can be equipped or is equipped with a measuring device for measuring the measured variable(s), wherein the measuring device is in particular:

a) is configured as an optical sensor, as a turbidity sensor, as a sensor for measuring a solids concentration contained in the medium, as a fluorescence sensor, as an absorption sensor, as a sensor for measuring a spectral absorption coefficient or as a sensor for measuring a concentration of an analyte contained in the medium; and/or b) comprises a transmitting device and a detector, wherein the transmitting device is configured to transmit transmitted radiation into the measuring cell, and the detector is configured to receive measuring radiation resulting from an interaction of the transmitted radiation along an optical path passing through the medium and emerging from the measuring cell, and to provide a detector signal corresponding to the measured variable-dependent measuring radiation.

BRIEF DESCRIPTION OF THE DRAWINGS

The present disclosure and its advantages will now be explained in detail using the figures in the drawing, which show three exemplary embodiments. The same elements are indicated by the same reference numbers in the figures.

FIG. 7 shows a perspective view of a molded part;

FIG. 8 shows a cross-sectional view of a molded part inserted into a duct; and FIGS. 9A-9C each show, from top to bottom, molded parts adapted for different insertion depths (top), stacks constructed from two structurally identical molded parts (middle), and devices having stacks inserted therein (bottom).

DETAILED DESCRIPTION

Figure 1:
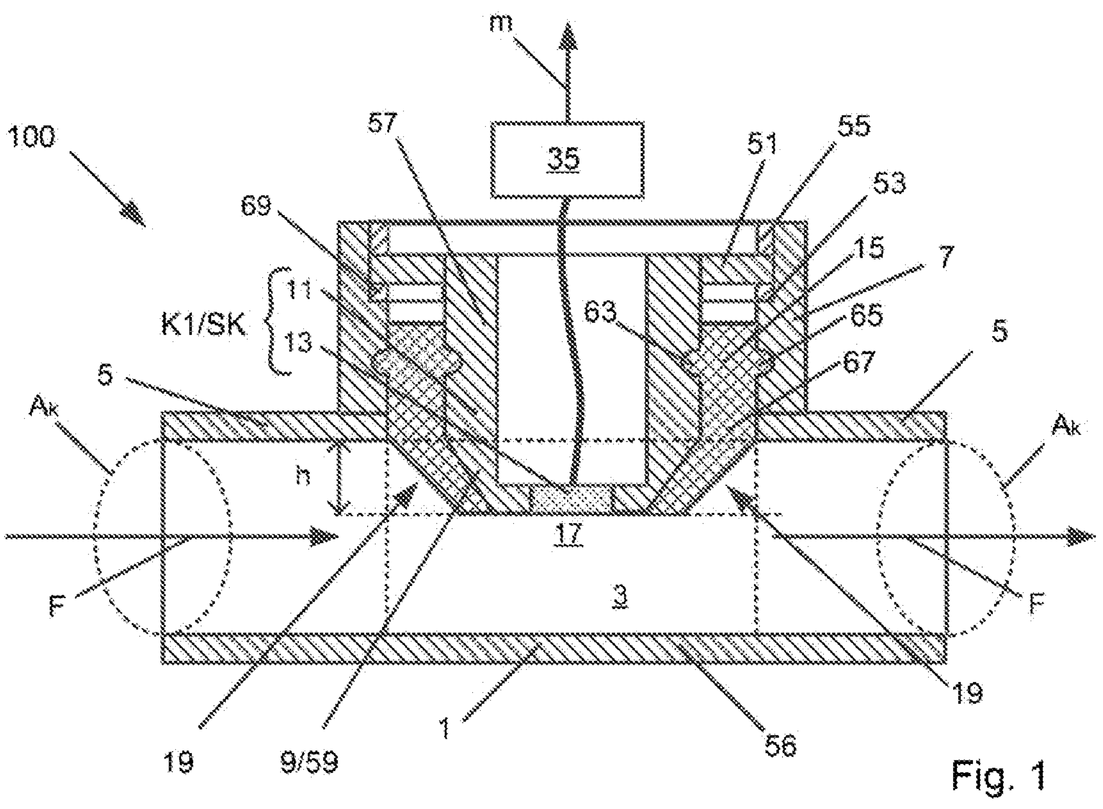
FIG. 1 shows a longitudinal cross-section of a device with a first component.

The present disclosure comprises a device for measuring a measured variable of a medium which comprises a measuring cell 1 through which the medium can flow in a flow direction F. A longitudinal section of a first embodiment of such a device 100 is shown in FIG. 1. The measuring cell 1 comprises an inner chamber 3 into which a channel 5 serving as an inlet opens on the inlet side, and a channel 5 serving as an outlet opens on the outlet side.

In FIG. 1, the channels 5 are arranged opposite one another in a direction extending parallel to the flow direction F. The channel 5 serving as an inlet can be connected, for example, to a supply line (not shown in FIG. 1) via which the medium can be supplied to the measuring cell 1. The channel 5 serving as the outlet connected to a discharge line (not shown in FIG. 1) via which the medium exiting the measuring cell 1 through the outlet can be discharged.

Both channels 5 have a channel cross-sectional area Ak, such as a circular channel cross-sectional area shown as a dashed line in FIG. 1. A constant cross-sectional area over a channel length of the channels 5 is especially suitable as a channel cross-sectional area Ak of the channels 5. The channel cross-sectional areas Ak of the channels 5 are preferably dimensioned in such a way that they are greater than or equal to a minimum surface, for example, greater than or equal to a production-related minimum surface area, and/or greater than or equal to a minimum surface defined by a cross-sectional area of the supply line and/or the discharge line. For example, the channels 5 may be configured as hollow cylinders with an inner diameter in the order of several millimeters, for example, an inner diameter of 2 mm to 20 mm.

In addition, the device 100 includes a first duct 7 opening into the inner chamber 3. As shown in FIG. 1, the first duct 7 is configured, for example, in such a way that it extends perpendicular to the flow direction F of the measuring cell 1 and projects outward in a direction perpendicular to the flow direction F in relation to the regions of the measuring cell 1 adjacent thereto. However, a perpendicular alignment of the first duct 7 is not absolutely necessary. The first duct 7 is configured, for example, as an integral component of the measuring cell 1, which in this case is preferably in one, monolithic piece, or is configured as a separate component attached to the measuring cell 1. Alternatively, however, the first duct can also be formed by a wall region of the measuring cell, which is also preferably one-piece in this case and which surrounds on the outside on all sides an opening of the measuring cell that opens into the inner chamber. In this case, a wall thickness of the wall region is dimensioned, for example, in such a way that it is equal to a duct height of the first duct.

Furthermore, the device 100 comprises a first component K1, which can be inserted or is inserted at a first insertion depth through the first duct 7 into the inner chamber 3 in such a way that a portion 9 of the first component K1 projects into the inner chamber 3. The portion 9 located in the inner chamber 3 consequently has a height h corresponding to the first insertion depth when the first component K1 is inserted with the first insertion depth in a direction extending perpendicular to the flow direction F.

Depending on the type of device and/or the measured variable to be measured, the first component K1 can be configured differently. FIG. 1 shows an example in which the first component K1 is configured as a sensor component SK of a sensor for measuring the measured variable. The sensor component SK shown as an example in FIG. 1 comprises a housing 11 with at least one measuring element 13 inserted therein at the end face, preferably flush with the front. Depending on the measured variable, the measuring element 13 is configured, for example, as a temperature measuring element for measuring a temperature of the medium, or as a measuring element for measuring an electrical or electrochemical property of the medium such as, for example, a conductivity of the medium or an ion concentration of ions contained in the medium. For this purpose, measuring elements known from the prior art, such as, for example, potentiometric measuring elements, amperometric measuring elements, and/or measuring elements comprising at least one measuring electrode, can be used.

Figure 2:
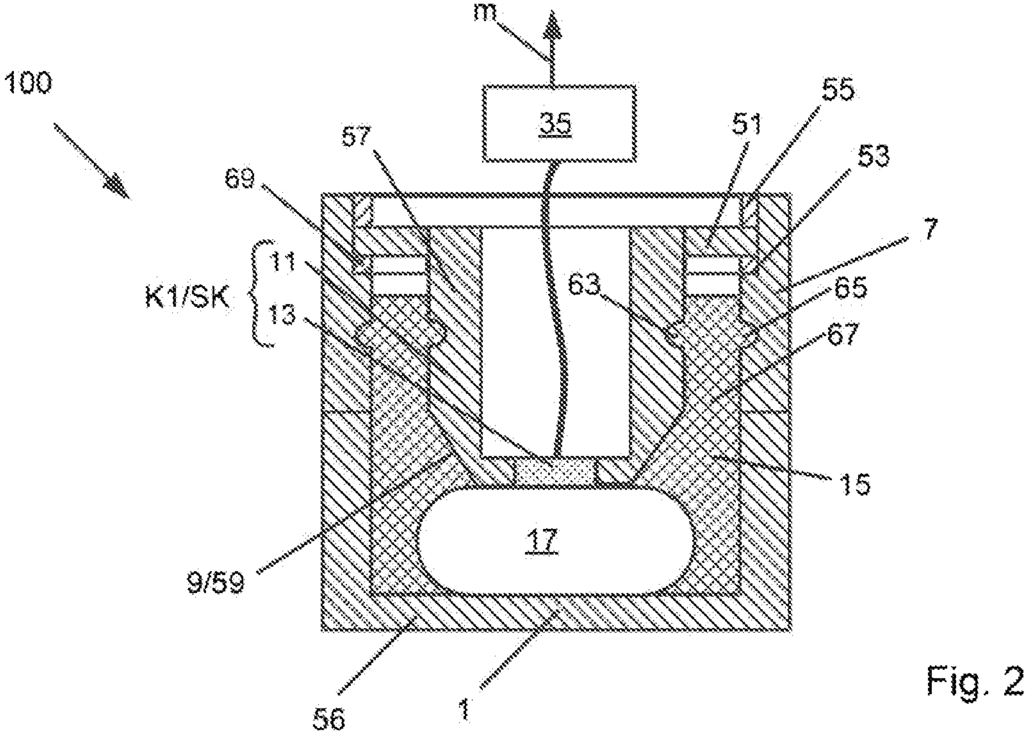
FIG. 2 shows a transverse cross-section of the device in FIG. 1.

Furthermore, the device 100 comprises a first molded part 15. The first molded part 15 is configured in such a way that it surrounds, on the exterior of at least all lateral sides, the portion 9 of the first component K1 inserted in the first insertion depth and a hollow chamber 17 adjacent to an end face of the first component K1 in the inner chamber 3. In this regard, FIG. 2 shows a sectional drawing of the device 100 of FIG. 1 in a transverse sectional plane aligned perpendicular to the longitudinal sectional plane shown in FIG. 1 and spanned by a longitudinal axis of the first duct 7 and a transverse axis extending perpendicular to the longitudinal axis of the first duct 7 and perpendicular to the flow direction F. For each of the two channels 5 opening into the inner chamber 3 of the measuring cell 1, the first molded part 15 has a recess 19 connecting the hollow chamber 17 to the respective channel 5, the cross-sectional area of which continuously transitions in the direction extending from the channel 5 to the hollow chamber 17 from a first cross-sectional area corresponding to the channel cross-sectional area Ak of the adjacent channel 5 to a second cross-sectional area, wherein the second cross-sectional area corresponds to a hollow chamber cross-sectional area of a hollow chamber region of the hollow chamber 17 adjacent to the respective recess 19. For this purpose, the first cross-sectional area may be, for example, approximately equal to or equal to the channel cross-sectional area Ak adjacent thereto, or a partial surface adjacent thereto of the channel cross-sectional area Ak, and/or the second cross-sectional area may be, for example, approximately equal to or equal to the hollow chamber cross-sectional area of the hollow chamber region of the hollow chamber 17 adjacent thereto. This shape of the first molded part 15 causes the first molded part 15 to fill the dead volumes resulting from the insertion of the first component K1 in a region of the inner chamber 3 facing the first duct 7. In addition, the recesses 19, which are configured as cross-section converters (e.g., adapters), largely prevent abrupt changes in cross-section arising in the flow direction F, which could trigger eddies and/or turbulence.

Figure 3:
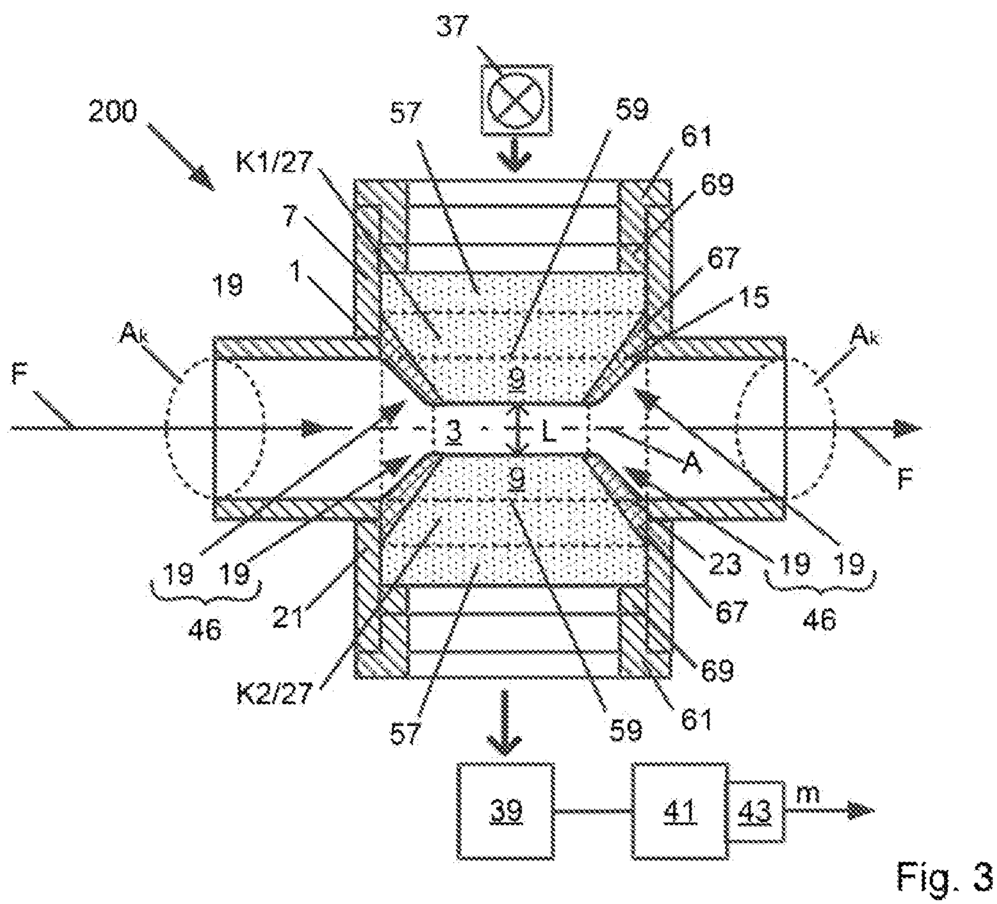
FIG. 3 shows a device with two components configured as windows.

FIG. 3 shows, as a further exemplary embodiment, a device 200 which differs from the exemplary embodiment shown in FIGS. 1 and 2 in that, in addition to the first duct 7, it comprises a second duct 21 which opens into the inner chamber 3. The second duct 21 is arranged on a side of the inner chamber 3 opposite the first duct 7. Otherwise, it is configured, for example, analogously or even structurally identical to the first duct 7, and/or also extends perpendicular to the flow direction F.

Figure 4:
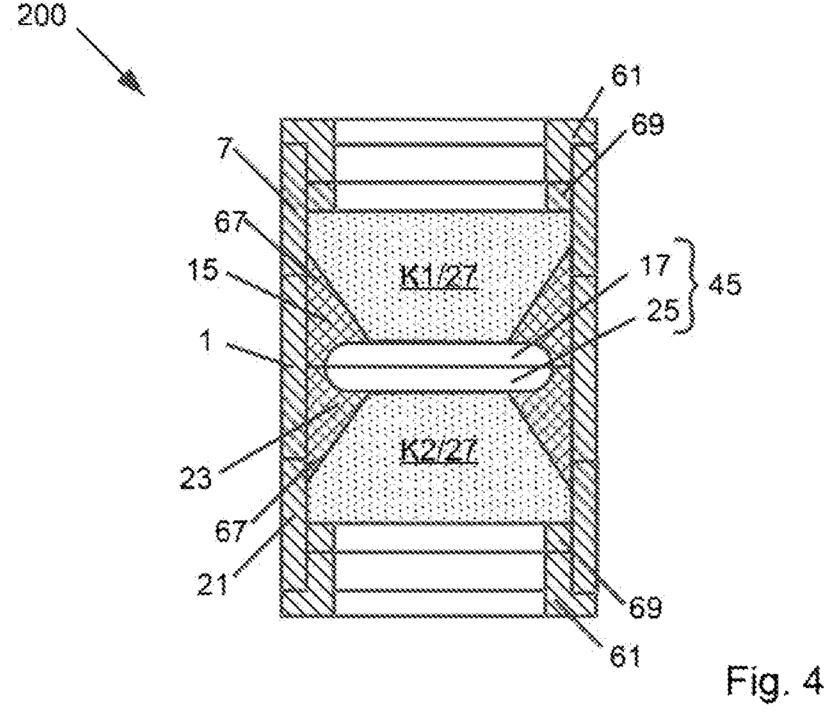
FIG. 4 shows a transverse cross-section of the device in FIG. 3.

Furthermore, the device 200 shown in FIG. 3 comprises a second component K2 and a second molded part 23. The second component K2 can be inserted or is inserted through the second duct 21 into the inner chamber 3 at a second insertion depth in such a way that an end-face portion 9 of the second component K2 projects into the inner chamber 3. The second molded part 23 is configured in such a way that it surrounds, on the exterior on all lateral sides, the portion 9 of the second component K2 and a second hollow chamber 25 adjacent to an end face of the second component K2 in the inner chamber 3. In this regard, FIG. 4 shows a sectional drawing of the device 200 of FIG. 3 in a sectional plane aligned perpendicular to the sectional plane shown in FIG. 3, and spanned by the longitudinal axis of the duct 7, 21 and a transverse axis extending perpendicular to the longitudinal axis of the duct 7, 21 and perpendicular to the flow direction F. As can be seen from FIGS. 3 and 4, the second molded part 23 includes, for each of the two channels 5 opening into the inner chamber 3 of the measuring cell 1, a recess 19 connecting the hollow chamber 25 to the respective channel 5, the cross-sectional area of which continuously transitions in the direction extending from the respective channel 5 to the hollow chamber 25 from a first cross-sectional area corresponding to the channel cross-sectional area Ak of the adjacent channel 5 to a second cross-sectional area, wherein the second cross-sectional area corresponds to a hollow chamber cross-sectional area of a hollow chamber region of the second hollow chamber 25 adjacent to the respective recess 19. For this purpose, the first cross-sectional area may be, for example, approximately equal to or equal to a partial surface adjacent thereto of the channel cross-sectional area Ak, and/or the second cross-sectional area may be, for example, approximately equal to or equal to the hollow chamber cross-sectional area of the hollow chamber region of the hollow chamber 25 adjacent thereto.

Analogous to the first molded part 15, the second molded part 23 also fills the dead volumes resulting from the insertion of the second component K2 in a region of the inner chamber 3 facing the second duct 21. In addition, the recesses 19 of the second molded part 23, which are configured as cross-section converters (e.g., adapters), largely prevent abrupt changes in cross-section arising in the flow direction F, which could trigger eddies and/or turbulence.

Analogous to the example shown in FIGS. 1 and 2, the first and second components K1, K2 can also be configured as a sensor component in the device 200 shown in FIGS. 3 and 4. FIGS. 3 and 4 show an alternative embodiment in which the first and second components K1, K2 are each configured as windows 27. A first component K1 configured as a window 27 can of course also be used in the device 100 shown in FIG. 1 instead of the sensor component SK shown there.

Figure 5:
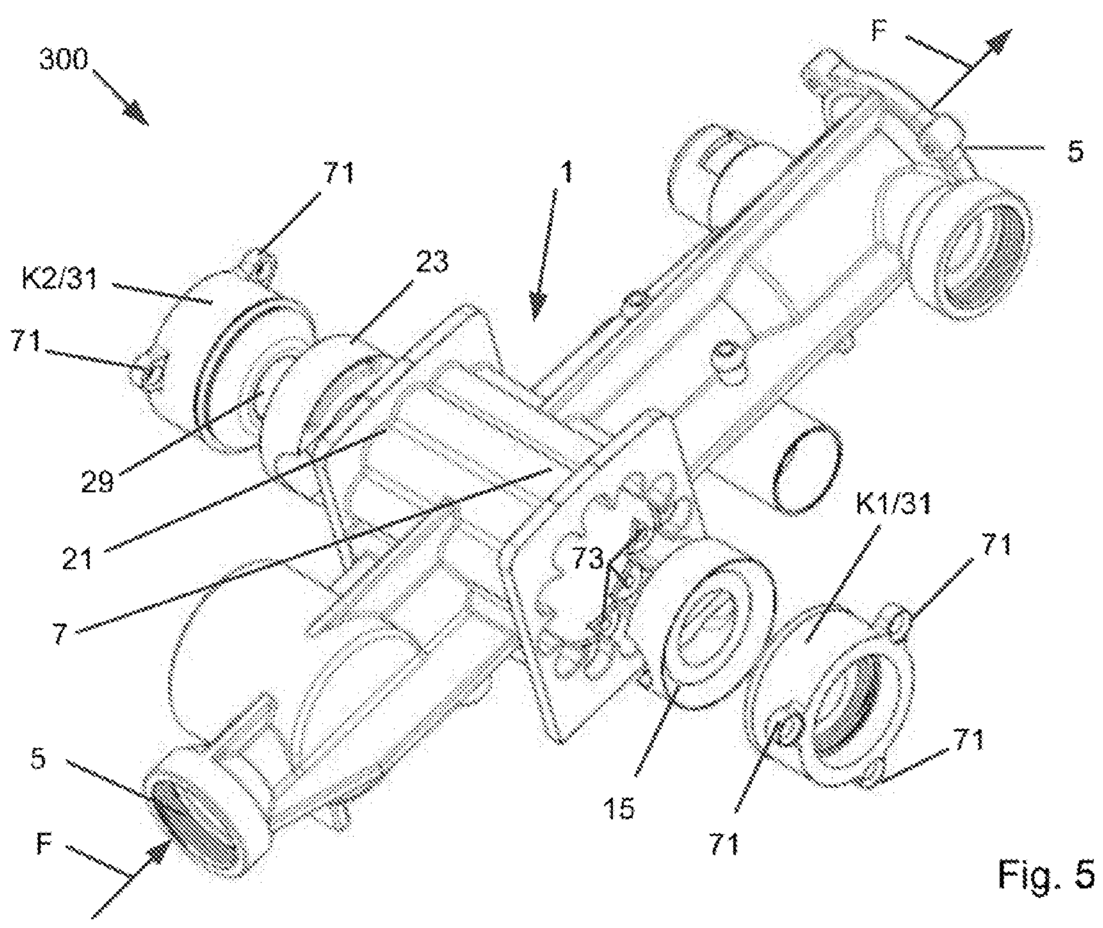
FIG. 5 shows a perspective view device with two components configured as window mounts.
Figure 6:
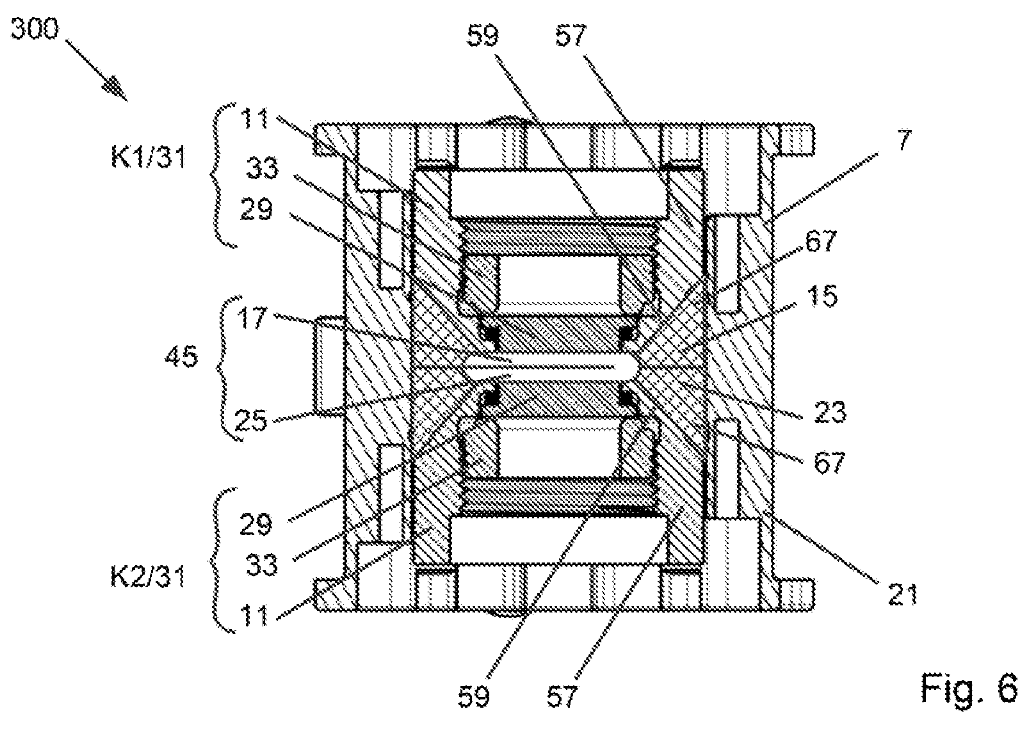
FIG. 6 shows a transverse cross-section of the device in FIG. 5.

FIG. 5 shows, as a further embodiment, an exploded view of a device 300 which differs from the device 200 shown in FIGS. 3 and 4 in that the first and the second components K1, K2 are each configured as a window mount 31 equipped with a window 29. FIG. 6 shows the device 300 of FIG. 5 in a sectional plane spanned by the longitudinal axis of the duct 7, 21 and a transverse axis extending perpendicular to the longitudinal axis of the duct 7, 21 and perpendicular to the flow direction F. A first component K1 configured as a window mount 31 equipped with a window 29 can of course also be used in the device 100 shown in FIG. 1 instead of the sensor component SK shown there.

Analogous to the sensor component SK shown in FIG. 1, the window mounts 31 shown in FIGS. 5 and 6 also each comprise, for example, a housing 11 into which the respective window 29 is inserted at the end face, preferably flush with the front. In this regard, in FIG. 6, an outer edge of each window 29 is clamped between a shoulder surface of the housing 11 of the respective window mount 31 and a pressure ring 33 inserted into the respective housing 11, with a seal inserted in between. Alternatively, instead of the window mounts 31 shown here, window mounts can also be used whose windows have a different shape and/or are fastened in another way.

The present disclosure has the advantages mentioned above. Individual components of the device 100, 200, 300 can each have configurations that can be used individually and/or in combination with one another.

The device 100, 200, 300 can therefore be equipped, for example, with a measuring device such as a sensor, or be configured to be equipped with such a measuring device.

FIG. 1 shows, as an example in this regard, a measuring device which comprises the measuring element 13 integrated in the first component K1 and measuring electronics 35 connected to the measuring element 13. The measuring electronics unit 35 is configured, for example, to determine and provide measurement results m of the measured variable, such as a temperature or conductivity of the medium measured by means of the correspondingly configured measuring element 13, on the basis of measurement signals generated by means of the measuring element 13.

In conjunction with devices such as the devices 200, 300 shown in FIGS. 3 to 6 which comprise at least one component K1, K2 configured as a window 27 or as a window mount 31 equipped with a window 29, a measuring device configured as an optical sensor, a measuring device configured as a turbidity sensor, for measuring turbidity of the medium, or a measuring device configured as a sensor for measuring a solid concentration contained in the medium, as a fluorescence sensor, or as an absorption sensor, for example as a sensor for measuring a spectral absorption coefficient or a concentration of an analyte contained in the medium, is suitable as a measuring device.

FIG. 3 shows an example of a measuring device which can also be inserted analogously in the device 300 shown in FIGS. 5 and 6 and which comprises a transmitting device 37, such as a light source, and a detector 39. The transmitting device 37 is configured to transmit transmitted radiation through one of the windows 27 or one of the windows 29 inserted in one of the window mounts 31 into the measuring cell 1. The detector 39 is configured to receive measurement radiation resulting from an interaction of the transmitted radiation along an optical path L extending through the medium located in the measuring cell 1 and emerging from the opposite window 27 or the window 29 inserted in the opposite window mount 31 from the measuring cell 1, and to provide a detector signal corresponding to the measurement radiation dependent on the measured variable. Optionally, the measuring device can additionally comprise an evaluation device 41 connected to the detector 39, which uses the detector signal output by the detector 39 to determine measurement results m of the measured variable and displays, outputs and/or makes these available in readable form, for example via an interface 43 connected thereto.

Irrespective of the type of employed measuring device, a part of the measuring device that is not contained in the components K1, K2, such as the measuring electronics unit 35 shown in FIG. 1, the transmitting device 37 shown in FIG. 3 and the detector 39 shown in FIG. 3, is, for example, accommodated in each case in a housing that can be mounted on the first duct 7 or the second duct 21, not shown in the figures.

A further embodiment provides that the measuring cell 1 is configured as a disposable measuring cell. Alternatively or additionally thereto, the measuring cell 1 is configured, for example, as a single-piece body, which comprises the channels 5, a housing wall surrounding the inner chamber 3, and the first duct 7 or the first and the second ducts 7, 21, respectively. Alternatively or additionally, the measuring cell 1 is made, for example, from a plastic and/or from a sterilizable material and/or is configured as an injection-molded part.

One embodiment, which can be used with devices 200, 300 with first and second components K1, K2 and is shown in FIGS. 3 to 6, provides that the first molded part 15 and the second molded part 23 are each configured in such a way that their mutually facing end faces rest on one another in the inner chamber 3 of the measuring cell 1 in such a way, that the recesses 19 provided in the two molded parts 15, 23 adjoin each other in pairs, and the hollow chambers 17, 25 surrounded by the molded parts 13, 15 adjoining each other in the inner chamber 3 form a measurement chamber 45 enclosed by the molded parts 15, 23. In addition, as shown by way of example in FIG. 3, they are configured in such a way that the measurement chamber 45 is connected to each channel 5 by a transition 46. Each transition 46 is formed in each case by one of the recesses 19 of the first molded part 15 and the recess 19 of the second molded part 23 adjacent thereto. The recesses 19 are dimensioned in such a way that the end of each transition 46 adjacent to one of the channels 5 has a cross-sectional area that corresponds or at least approximately corresponds to the channel cross-sectional area Ak of the channel 5 adjacent thereto, and the end of each transition 46 adjacent to the measurement chamber 45 has a cross-sectional area that corresponds or at least approximately corresponds to a measurement chamber cross-sectional area of a measurement chamber region of the measurement chamber 45 adjacent to the respective transition 46.

Compared to alternatively usable embodiments in which the two molded parts 15, 23 are spaced apart from one another in the inner chamber 3 of the measuring cell 1, this embodiment offers the advantage that the shape of the measurement chamber 45 can be or is freely predefined within the limits given by the size of the inner chamber 3 and the distance of the two components K1, K2 from one another by the shaping of the two molded parts 15, 23. This scope for design is preferably used in such a way that the measurement chamber 45 has a laminar flow design, a dead space-free design and/or a cross-sectional area that does not change at all in the flow direction F or at least only changes continuously, in particular only to a small extent.

An optional embodiment provides that the first molded part 15 and the second molded part 23 have locking elements 47, 49 which are complementary to one another on their end faces facing one another in the inner chamber 3, and which engage in a form-fit when the two molded parts 15, 23 rest against one another in such a way that their recesses 19 adjoin one another in pairs. For example, mutually complementary plug-in connector elements, such as projections provided on one of the two molded parts 15, 23, are suitable as mutually complementary locking elements 47, 49, which projections can be inserted into complementary recesses of the other molded part 23, 15 in a form-fit manner.

FIG. 7 shows, as an example, a view of a molded part 15/23 which can be used in the device 200 shown in FIGS. 3 and 4, and also in the device 300 shown in FIGS. 5 and 6, both as a first molded part 15 and as a second molded part 23 which is structurally identical thereto. As shown in FIG. 7, the locking elements 47, 49 of the first and the second molded parts 15, 23 are each configured as element pairs in such a way that each molded part 15, 23 also comprises the complementary locking element 49 to the or to each of its locking elements 47.

The molded part 15/23 shown in FIG. 7 comprises an element pair, the locking element 47 of which is configured as an arcuate web projecting on one of the two mutually opposite edges of the molded part 15/23, and its locking element 49 which is complementary thereto is configured as an arcuate groove of the same shape as the web and provided in the other edge. Alternatively, however, a different number and/or complementary locking elements having a different shape can also be used.

Irrespective of the embodiments described above, the devices 100, 200, 300 described here, for example, each have fastening means by means of which the first component K1, or the first components K1 and the second component K2, are each fastened or can be fastened at the insertion depth provided for the corresponding component K1, K2 in the device 100, 200, 300. These fastening means can be configured in different ways.

FIG. 1 shows an embodiment in which the fastening means comprise at least one fastening element 51, which is configured as a component of the first component K1 or connected to the first component K1, protrudes outwardly in a direction extending radially to the longitudinal axis of the first duct 7, such as one or more annular disks and/or projections, the outer edge of which rests on a counter bearing 53. A shoulder surface integrated in the first duct 7 or in a body connected to the first duct is suitable as a counter bearing 53, for example. In this variant, each fastening element 51 is clamped, for example, between a pressure ring 55 mounted in the first duct 7, for example screwed in, and the counter bearing 53. Alternatively, each fastening element 51 can be fastened to the counter bearing 53, for example by means of a screw screwed into the counter bearing 53 through the corresponding fastening element 51. Corresponding fastening means can also be used analogously for fastening the first and the second component K1, K2 of the devices 200, 300 shown in FIGS. 3 to 6.

Alternatively or additionally thereto, a possibly desired or required fastening of the first molded part 15 or of the first and the second molded part 15, 23 can also be realized in different ways.

One embodiment variant consists in that the first molded part 15 is clamped between the first component K1 and a counter bearing. In this regard, FIGS. 1 and 2 show an embodiment in which the first molded part 15 is clamped between a lateral surface of the first component K1 pointing into the inner chamber 3 of the measuring cell 1, and a counter bearing formed by a wall region 56 of the measuring cell 1 opposite the first duct 7 and delimiting the inner chamber 3.

In devices 200, 300 with first and second molded parts 15, 23, the second molded part 23 is preferably also clamped between the second component K2, e.g., its lateral surface pointing into the inner chamber 3 of the measuring cell 1, and a counter bearing. In this regard, FIGS. 3 to 6 show an embodiment in which the first molded part 15 and the second molded part 23 are arranged on top of each other in the inner chamber 3 in a stack, and the stack is clamped between the lateral surface of the first component K1 and the lateral surface of the second component K2. In this embodiment, the lateral surface of the second component K2 forms the counter bearing required for the clamping of the first molded part 15 in cooperation with the adjacent second molded part 23. Conversely, the lateral surface of the first component K1 forms the counter bearing required for the clamping of the second molded part 23 in cooperation with the adjacent first molded part 15. Alternatively, however, the first molded part 15 and the second molded part 23 can also be arranged on one another in a stack which is not clamped in the device at all or in another way.

Different embodiments can be used with regard to the lateral surface of the first and/or of the second component K1, K2 required for clamping. One embodiment consists in that the first component K1 has a rear region 57 arranged in the first duct 7 and a front region 59 adjacent thereto, tapering in a direction parallel to the longitudinal axis of the first duct 7 into the inner chamber 3 of the measuring cell 1. For this purpose, the front region 59 has, for example, a cross-sectional area which decreases in the direction parallel to the longitudinal axis of the first duct 7 into the inner chamber 3 of the measuring cell 1. The front region 59 forms or comprises the portion 9 of the first component K1 arranged in the inner chamber 3 and surrounded on the outside on all sides by the first molded part 15. In this embodiment, the surface of the front region 59 pointing into the inner chamber 3 forms or comprises the lateral surface of the first component K1 that is used or can be used for clamping the first molded part 15. FIG. 1 shows an embodiment for this purpose in which the rear region 57 of the first components K1 is formed by a, for example, cylindrical region, and the front regions 59 are formed by a frustoconical region of the housing 11 of the sensor component SK.

In devices 200, 300 with second component K2, alternatively or additionally, the second component K2 can also be configured in this way. In this case, the second component K2 has a rear region 57 arranged in the second duct 21 and a front region 59 adjacent thereto, tapering in parallel to the longitudinal axis of the second duct 21 into the inner chamber 3 of the measuring cell 1, which forms or comprises the portion 9 of the second component K2 arranged in the inner chamber 3 and surrounded on the outside on all sides by the second molded part 23. Accordingly, the surface of the front region 59 of the second component K2 pointing into the inner chamber 3 forms or comprises the lateral surface of the second component K2 that is used or usable for clamping the second molded part 23.

FIGS. 3 and 4 show an embodiment in which the rear regions 57 of the first and the second components K1, K2 are each formed by a cylindrical window region of the corresponding window 27, and the front regions 59 of the first and the second components K1, K2 are each formed by a frustoconical window region adjacent to the cylindrical window region of the respective window 27.

FIGS. 5 and 6 show a further embodiment in which the rear regions 57 of the first and the second components K1, K2 are each formed by a cylindrical region of the corresponding window mount 31, and the front regions 59 of the first and the second components K1, K2 are each formed by a frustoconical region of the respective window mount 31 adjacent to the cylindrical region of the respective window mount 31.

Devices 200, 300, in which the first molded part 15 and the second molded part 23 are arranged one on top of the other in a stack clamped between the first component K1 and the second component K2, offer the advantage that the fastening means for fastening the first component K1 and the second component K2 do not necessarily have to be connected to the corresponding component K1, K2. FIGS. 3 and 4 show, as an exemplary embodiment, fastening means which comprise two fastening elements configured as pressure rings 61. One of the pressure rings 61 is inserted, e.g., screwed, into the first duct 7 up to a stop in such a way that its outer edge rests on an outer edge of the first component K1. The other pressure ring 61 is inserted, e.g., screwed, into the second duct 21 up to a stop in such a way that its outer edge rests on an outer edge of the second component K2.

Alternatively or additionally to clamping the first molded part 15 and/or the second molded part 23, the first molded part 15 is fastened or can be fastened to the first component K1, and/or the second molded part 23 is fastened or can be fastened to the second component K2. FIG. 1 shows an embodiment that can analogously also be used to attach the first and second molded parts 15, 23 shown in FIGS. 3 to 6 given a corresponding design of the first and second components K1, K2. There, a region of the first molded part 15 surrounding the first component K1 has, on the inside, at least one elastic bulge 63 which engages into a recess which is complementary thereto and is provided in the first component K1. Alternatively or additionally, a region of the first molded part 15 surrounding the first component K1 has, on the outside, at least one elastic bulge 65 which protrudes into a recess of the first duct 7 that is complementary thereto.

The elasticity of the bulge(s) 63, 65 can be achieved, for example, by the first and/or second molded part 15, 23 comprising the or each of the bulge(s) 63, 65 each consisting of an elastic material as a whole. Alternatively, the first and/or second molded parts 15, 23 can each be configured as a rigid body on which the or each of the bulge(s) 63, 65 is fastened, for example glued.

An embodiment which can be used alternatively or in addition to the embodiments described above consists in that the first molded part 15 comprises a region 67 consisting of a sealing material, such as a rubber or an elastomer, projecting into the first duct 7 and sealing a gap which exists between the first duct 7 and the first component K1 and surrounds the first component K1 on the outside on all sides and opens into the inner chamber 3 of the measuring cell 1. In devices 200, 300 with first and second components K1, K2, the second molded part 23 preferably also has, alternatively or additionally thereto, a region 67 consisting of a sealing material, such as a rubber or an elastomer, projecting into the second duct 21, and sealing a gap which exists between the second duct 21 and the second component K2, surrounds the second component K2 on the outside on all sides and opens into the inner chamber 3 of the measuring cell 1. Each region 67 projecting into one of the gaps offers the advantage that additional process seals for sealing the respective gap can be dispensed with. Furthermore, the regions 67 projecting into the gaps cause the molded parts 15, 23 to be fixed in their position. Both make it easier to assemble the corresponding device 200, 300.

Alternatively or additionally, the first molded part 15 and/or the second molded part 23 has, for example, in each case a smooth, chemically resistant, abrasion-resistant and/or antibacterial surface, or is coated with a coating having smooth, chemically resistant, abrasion-resistant and/or antibacterial properties.

A further optional embodiment consists in that the first duct 7 and the first molded part 15 have alignment elements 68*a*, 68*b* which are complementary to each other and extend parallel to the longitudinal axis of the first duct 7 and are configured in such a way that the first molded part 15 can only be inserted into the measuring cell 1 in one alignment through the first duct 7, in which the recesses 19 of the first molded part 15 open in one of the two channels 5 after insertion. In devices 200, 300 having a second molded part 23, alternatively or additionally, the second duct 21 and the second molded part 23 preferably also have alignment elements 68*a*, 68*b* which are complementary to one another and extend parallel to the longitudinal axis of the second duct 21 and are configured in such a way that the second molded part 23 can only be inserted into the measuring cell 1 in one alignment through the second duct 21, in which the recesses 19 of the second molded part 23 open in one of the two channels 5 after insertion. FIG. 8 shows, as an exemplary embodiment thereof, a sectional drawing of a molded part 15, 23 inserted into one of the ducts 7, 21, which has on the outside two alignment elements 68*a* formed as webs extending parallel to the longitudinal axis of the duct 7, 21 and projecting radially outwards, which, when the molded part 15, 23 is inserted into the duct 7, 21, are guided in alignment elements 68*b* of the duct 7, 21 which are complementary to the webs and are formed here as grooves extending parallel to the longitudinal axis of the duct 7, 21. The engagement of the mutually complementary alignment elements 68*a*, 68*b* causes the molded part 15, 23 to be insertable only in the desired alignment. The axial extent of the alignment elements 68*a*, 68*b* enables the axial insertion of the molded part 15, 23 in the desired alignment and prevents a rotation of the molded part 15, 23 about a rotational axis extending parallel to the longitudinal axis of the duct 7, 21 during the insertion process.

Another optional embodiment consists in that the device 100, 200, 300 is configured in such a way that the first component K1 can be inserted or is inserted into the measuring cell 1 at a first insertion depth selectable from a plurality of insertion depths. In devices 200, 300 having a second component K2, alternatively or additionally, the second component K2 also can be inserted or is inserted into the inner chamber 3 of the measuring cell 1 at a second insertion depth selectable from a plurality of insertion depths. This offers the advantage that the insertion depth of the respective component K1, K2 can be adapted at least in stages to the measurement task to be carried out by means of the device 100, 200, 300.

This can be brought about in the manner shown in FIGS. 1 to 4, for example, in that the device 100, 200 comprises a group of spacers 69, such as for example rings or spacers of different heights, provided for achieving the different, selectable insertion depths. In this case, depending on the size of the selected first insertion depth, the first component K1 is inserted into the first duct 7 either directly or with the interposition of at least one spacer 69 selected from the group using the selected first insertion depth. In the case of devices 200 comprising two components K1, K2, the second component K2 is, depending on the size of the selected second insertion depth, alternatively or additionally inserted into the second duct 21 either directly or with interposition of at least one spacer 69 selected from the group on the basis of the selected second insertion depth.

FIGS. 1 and 2 show by way of example a spacer 69 arranged between the fastening element 51 and the counter bearing 53. FIGS. 3 and 4 show examples of two spacers 69 arranged between one of the windows 27 and the adjacent pressure ring 55.

FIGS. 5 and 6 show an alternative embodiment variant in which the selectability of the first insertion depth of the first component K1 and/or the second insertion depth of the second component K2 is in each case realized in the manner described in the '406 Application and included here as a reference. For this purpose, the depicted device 300 is configured, for example, in such a way that the first component K1 has a predetermined number of radially outwardly projecting projections 71, and the first duct 7 comprises, on the inside, a set of support surfaces 73 corresponding to the number of projections 71 of the first component K1 for each selectable first installation depth. In this case, the support surfaces 73 of each set, relative to the longitudinal axis of the first duct 7, are arranged so as to be distributed in the radial direction around the inner chamber of the first duct 7 in such a way that the projections 71 of the first component K1 can be placed on the support surfaces 73 of the respective set. In addition, they are arranged in the axial direction in such a way that the first component K1 is inserted into the first duct 7 at the first insertion depth assigned to the respective set of support surfaces 73 when their projections 71 rest on the support surfaces 73 of the set of support surfaces 73 assigned to this first insertion depth. This results, in particular, in an angle-coded arrangement of the sets of support surfaces 73, which makes it possible to achieve the selected first insertion depth by aligning the projections 71 of the first component K1 by rotating the first component K1 about its longitudinal axis in such a way that, during axial insertion into the first duct 7, they come to rest on the support surfaces 73 of the set with which the selected first insertion depth is achieved.

Alternatively or additionally, the device 300 is configured, for example, in such a way that the second component K2 has a predetermined number of radially outwardly projecting projections 71, and the second duct 21 comprises, on the inside, a set of support surfaces 73 corresponding to the number of projections 71 of the second component K2 for each selectable second installation depth. In this case, the support surfaces 73 of each set, relative to the longitudinal axis of the second duct 21, are arranged so as to be distributed in the radial direction around the inner chamber of the second duct 21 in such a way that the projections 71 of the second component K2 can be placed on the support surfaces 73 of the respective set. In addition, they are arranged in the axial direction in such a way that the second component K2 is inserted into the second duct 21 at the second insertion depth assigned to the respective set of support surfaces 73 when their projections 71 rest on the support surfaces 73 of the set of support surfaces 73 assigned to this second insertion depth.

Irrespective of how the selectability of the first insertion depth of the first component K1 and/or the second insertion depth of the second component, K2 is achieved in each case, the correspondingly configured device 100, 200, 300 in each case comprises a group of molded parts of different dimensions provided for the different selectable insertion depths. In devices 100, 200, 300, in which the first component K1 is insertable or inserted at a first insertion depth selectable from a plurality of insertion depths, the first molded part 15 is accordingly a molded part selected from the group of molded parts on the basis of the selected first insertion depth. In devices 200, 300, in which the second component K2 is insertable or inserted at a second insertion depth selectable from a plurality of insertion depths, the second molded part 23 is a molded part selected from the group of molded parts on the basis of the selected second insertion depth.

FIGS. 9A-9C show as examples thereof overview, in the upper row of which a group of three molded parts 15*a*, 15*b*, 15*c* adapted for different insertion depths is depicted as an example. The three molded parts 15*a*, 15*b*, 15*c* differ by their construction height adapted to one of three different selectable insertion depths. Otherwise, they are configured, for example, analogously to the molded part 15/23 depicted in FIG. 7. A stack is shown in FIGS. 9A-9C, respectively, under each molded part 15*a*, 15*b*, 15*c*, in which the molded part 15*a*, 15*b* or 15*c* shown above in the row is arranged on a second molded part 23*a*, 23*b* or 23*c*, which is structurally identical thereto. A device 200*a*, 200*b*, 200*c* configured analogously to the device 200 depicted in FIG. 3 is depicted below each stack in FIGS. 9A-9C, respectively, in which the stack depicted above the corresponding device 200*a*, 200*b*, 200*c* is arranged between the first component K1 inserted therein at the first insertion depth assigned to the first molded part 15*a*, 15*b*, 15*c* and the second component K2 inserted at the second insertion depth assigned to the second molded part 23*a*, 23*b*, 23*c*.

Regardless of whether the first insertion depth of the first component K1 and/or the second insertion depth of the second component K2 is selectable or fixed in each case, the insertion depths of both components K1, K2 are preferably each selected or specified in such a way that the end faces of the two components K1, K2 are arranged at the same distance from an axis A, which coincides with the longitudinal axes of both channels 5 and is depicted as an example in FIG. 3 as a dashed line. Alternatively or additionally thereto, the two molded parts 15, 23 are preferably arranged and configured structurally identical and/or mirror-symmetrically to the axis A coinciding with the longitudinal axes of the channels 5. The degree of symmetry achieved thereby promotes the laminar flow through the measuring cell 1. In addition, structurally identical first and second molded parts 15, 23 reduce the variety of parts of the different components required to manufacture the device, which in turn has an advantageous effect on manufacturing costs.

The devices 200, 300 described here with first and second components K1, K2 are especially advantageous when the end faces of the first and second components K1, K2 should or must be arranged at a short distance from one another. The latter is especially the case with the devices 200, 300 described with reference to FIGS. 3 to 6 for carrying out optical measurements in which very short optical path lengths L corresponding to the spacing of the windows 27 or of the windows 29 inserted into the window mounts 31 are required in certain circumstances depending on the properties of the medium. With these devices 200, 300, very small spacings of the end faces of the first and second components K1, K2 can be realized without thereby creating significant disturbances of the laminar flow, such as for example eddies and/or turbulences, without damage to the medium occurring from shear forces, and/or a significant mixing of volumes of the medium entering the measuring cell 1 in chronological succession occurring.

In this case, the spacing of the end faces can also easily be less than or equal to a height of the channel inner chambers of the channels 5 through which the flow passes and which extends parallel thereto, and/or only be one or a few millimeters, such as 1 mm to 10 mm, 1 mm to 8 mm, 1 mm to 5 mm or only 1 mm to 3 mm. Alternatively or additionally thereto, the spacing is adjustable, for example, by the selection of the first insertion depth of the first component K1 and the second insertion depth of the second component K2 within a comparatively large distance range, such as for example a spacing range of 1 mm to 20 mm. Therefore, with a single device 200, 300, for example, spacings of 1 mm, 2 mm, 5 mm, 8 mm, 10 mm, 15 mm, and 20 mm can optionally be achieved by the selection of the insertion depths.

The invention claimed is:

1. A device for measuring a measured variable of a medium, the device comprising:

- a measuring cell through which the medium can flow in a flow direction, the measuring cell including an inner chamber, an inlet channel, which opens into the inner chamber on an inlet side, and an outlet channel, which opens into the inner chamber on an outlet side;
- a first duct extending along a first longitudinal axis and opening into the inner chamber;
- a first component configured to be introduced through the first duct such that a first end portion of the first component extends into the inner chamber at a first insertion depth; and
- a first molded part, which:
  - surrounds, on an exterior of at least all lateral sides, the first end portion of the first component introduced at the first insertion depth;
  - surrounds and delimits a hollow chamber adjacent to an end face of the first component in the inner chamber on all lateral sides; and
  - includes a recess connecting the hollow chamber to the inlet channel and a recess connecting the hollow chamber to the outlet channel, wherein each of the two recesses is configured as a cross-section converter having a cross-sectional area that continuously and gradually transitions from a first cross-sectional area to a second cross-sectional area in a direction extending from a respective channel to the hollow chamber, wherein the first cross-sectional area corresponds to a channel cross-sectional area of the respective channel adjoining the respective recess, and the second cross-sectional area corresponds to a hollow chamber cross-sectional area of a hollow chamber region of the hollow chamber adjacent to the respective recess.

2. The device according to claim 1, wherein:

the first component includes a rear region disposed in the first duct and a front region adjacent thereto, which tapers in a direction parallel to the first longitudinal axis of the first duct into the inner chamber of the measuring cell, which forms or comprises the first end portion disposed in the inner chamber, and which is surrounded on the exterior of at least all the lateral sides by the first molded part; and/or the first molded part is clamped between a lateral surface of a front region of the first component facing into the inner chamber of the measuring cell and a counter bearing, wherein the counter bearing comprises a wall region of the measuring cell opposite the first duct and delimiting the inner chamber.

3. The device according to claim 1, further comprising:

a second duct arranged on a side of the inner chamber opposite the first duct and opening into the inner chamber;

a second component configured to be introduced through the second duct into the inner chamber at a second insertion depth such that a second end portion of the second component projects into the inner chamber, and a second molded part, which:

surrounds, on an exterior of at least all lateral sides, the second end portion of the second component introduced in the second insertion depth and a hollow chamber adjacent to an end face of the second component in the inner chamber; and includes a recess for each of the inlet and outlet channels that connects the hollow chamber to the respective channel, wherein each recess has a cross-sectional area that continuously and gradually transitions from a first cross-sectional area to a second cross-sectional area in the direction extending from the respective channel to the hollow chamber, wherein the first cross-sectional area corresponds to a channel cross-sectional area of the respective channel adjacent thereto, and wherein the second cross-sectional area corresponds to the hollow chamber cross-sectional area of the hollow chamber region of the hollow chamber adjacent to the respective recess.

4. The device according to claim 3, wherein:

the first molded part and the second molded part lie relative to each other in the inner chamber of the measuring cell such that their respective recesses adjoin one another in pairs;

a portion of the hollow chamber surrounded by the first molded part together with a portion of the hollow chamber surrounded by the second molded part delimit a measurement chamber defined by both molded parts; and the measurement chamber is connected to each channel by a transition, wherein each transition is formed by one of the recesses of the first molded part and the recess of the second molded part adjacent thereto.

5. The device according to claim 4, wherein the measurement chamber is configured to, at least one of: facilitate a laminar flow; be free of dead space; have a constant cross-sectional area in the flow direction; and have a continuously changing cross-sectional area in the flow direction.

6. The device according to claim 4, wherein:

an end of each transition adjacent to the respective channel has a cross-sectional area corresponding to or approximately corresponding to the channel cross-sectional area of the respective channel adjacent thereto; and an end of each transition adjacent to the measurement chamber has a cross-sectional area corresponding to or approximately corresponding to a measurement chamber cross-sectional area of a measurement chamber region of the measurement chamber adjacent to the respective transition.

7. The device according to claim 3, wherein the first molded part and the second molded part include mutually complementary locking elements on corresponding end faces, which face each other in the inner chamber of the measuring cell and which engage in a form-fit manner when the first molded part and the second molded part rest against each other such that their respective recesses adjoin one another in pairs, wherein the locking elements of the first molded part and the locking elements of the second molded part are configured as element pairs such that each molded part, with regard to its locking element, comprises the locking element complementary thereto.

8. The device according to claim 3, wherein:

the first molded part and the second molded part are arranged one on top of the other in a stack arranged, or are clamped, between the first component and the second component; and/or the first molded part and the second molded part are arranged one on top of the other in a stack, which is clamped between a lateral surface of the first component and a lateral surface of the second component, wherein the lateral surface of the first component is a surface of a front region of the first component extending into the measuring cell and tapering in a direction parallel to the longitudinal axis of the first duct into the measuring cell, and/or the lateral surface of the second component is a surface of a front region of the second component extending into the measuring cell and tapering in a direction parallel to the longitudinal axis of the second duct into the measuring cell.

9. The device according to claim 3, wherein:

the end faces of the first component and the second component are disposed at the same distance from an axis which extends between the two end faces and coincides with the longitudinal axes of both channels; and/or the first molded part and the second molded part are structurally identical and/or are arranged and/or formed mirror-symmetrically to the axis coinciding with the longitudinal axes of the channels.

10. The device according to claim 3, wherein the end faces of the first component and the second component are disposed at a distance from each other in the inner chamber of the measuring cell, wherein the distance:

is within a distance range of 1-20 millimeters (mm) and/or is adjustable in steps within the distance range, wherein the first component is configured to be introduced at the first insertion depth, which is selectable, and/or the second component is configured to be introduced at the second insertion depth, which is selectable from different insertion depths; and/or is less than or equal to a height of internal chambers of the inlet and outlet channels through which the medium flows and which extend parallel thereto and/or is 1-3 mm.

11. The device according to claim 3, wherein the end faces of the first component and the second component are disposed at a distance from each other in the inner chamber of the measuring cell, wherein the distance is 1-10 mm.

12. The device according to claim 11, wherein the distance is 1-3 mm.

13. The device according to claim 3, wherein the first molded part includes on an interior at least one elastic bulge adapted to engage a recess of the first component that is complementary thereto and/or includes on an exterior at least one elastic bulge adapted to engage a recess of the first duct that is complementary thereto; and/or wherein the second molded part includes on an interior at least one elastic bulge adapted to engage in a recess of the second component that is complementary thereto and/or includes on an exterior at least one elastic bulge adapted to engage a recess of the second duct that is complementary thereto.

14. The device according to claim 3, wherein:

the first molded part comprises a region consisting of a sealing material configured to seal a gap, which exists between the first duct and the first component, surrounds the first component on the exterior of at least all lateral sides, and opens into the inner chamber of the measuring cell; and/or the second molded part comprises a region consisting of a sealing material configured to seal a gap, which exists between the second duct and the second component, surrounds the second component on the exterior of at least all lateral sides, and opens into the inner chamber of the measuring cell.

15. The device according to claim 3, further comprising a set of molded parts of different dimensions configured to provide a plurality of different insertion depths such that:

the first component is insertable or inserted at the first insertion depth selectable from the plurality of different insertion depths, wherein the first molded part is selectable or selected from the set of molded parts based on the first insertion depth for the first component; and/or the second component is insertable or inserted at the second insertion depth selectable from the plurality of different insertion depths, wherein the second molded part is selectable or selected from the set of molded parts based on the second insertion depth selected for the second component.

16. The device according to claim 3, wherein:

the first duct and the first molded part include alignment elements, which are complementary to each other and extend parallel to the longitudinal axis of the first duct, the alignment elements configured such that the first molded part is insertable into the measuring cell through the first duct in only one alignment, in which the recesses of the first molded part open in the corresponding inlet and outlet channels after insertion; and/or the second duct and the second molded part include alignment elements, which are complementary to each other and extend parallel to the longitudinal axis of the second duct, the alignment elements configured such that the second molded part is insertable into the measuring cell through the second duct in only one alignment, in which the recesses of the second molded part open in the corresponding inlet and outlet channels after insertion.

17. The device according to claim 3, wherein:

the measuring cell is, at least one of: configured as a flow cell and/or as a disposable measuring cell; configured as a one-piece body; made of a plastic and/or a sterilizable material; and configured as an injection molded part;

the first component and/or the second component are each configured as a sensor component of a sensor for measuring the measured variable, comprises a housing with a measuring element inserted therein at an end face, is configured as a window, or is configured as a window mount including a window; and/or the first molded part and/or the second molded part in each case, is at least one of:

configured as a one-piece molded part and/or comprises entirely or sectionally of a sealing material, a rubber, or an elastomer; and includes a smooth, chemically resistant, abrasion-resistant surface and/or a surface having antibacterial properties, or is coated with a coating having smooth, chemically resistant, abrasion-resistant and/or antibacterial properties; and/or the device:

is configured to accept a measuring device for measuring the measured variable, wherein the measuring device;

is configured as an optical sensor, as a turbidity sensor, as a sensor operable to measure a solids concentration contained in the medium, as a fluorescence sensor, as an absorption sensor, as a sensor operable to measure a spectral absorption coefficient, or as a sensor operable to measure a concentration of an analyte contained in the medium; and/or comprises a transmitting device and a detector, wherein the transmitting device is configured to transmit transmitted radiation into the measuring cell, and the detector is configured to:

receive measuring radiation resulting from an interaction of the transmitted radiation along an optical path passing through the medium and emerging from the measuring cell; and provide a detector signal corresponding to the measured variable-dependent measurement radiation.

* * * * *